(12) United States Patent
Kumar et al.

(10) Patent No.: US 7,730,501 B2
(45) Date of Patent: Jun. 1, 2010

(54) METHOD FOR PARALLEL PROCESSING OF EVENTS WITHIN MULTIPLE EVENT CONTEXTS MAINTAINING ORDERED MUTUAL EXCLUSION

(75) Inventors: Alok Kumar, Santa Clara, CA (US); Prashant R. Chandra, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1714 days.

(21) Appl. No.: 10/718,497

(22) Filed: Nov. 19, 2003

(65) Prior Publication Data

US 2005/0108718 A1 May 19, 2005

(51) Int. Cl.
G06F 9/44 (2006.01)
(52) U.S. Cl. .......................... 719/331; 719/318
(58) Field of Classification Search ......... 719/310–314, 719/318, 330–332; 709/217; 717/135
See application file for complete search history.

(56) References Cited

U.S. PATENT DOCUMENTS

| | | | | |
|---|---|---|---|---|
| 5,925,108 A * | 7/1999 | Johnson et al. | ............ | 719/318 |
| 6,035,321 A * | 3/2000 | Mays | ............ | 718/103 |
| 6,151,688 A * | 11/2000 | Wipfel et al. | ............ | 714/48 |
| 6,338,112 B1 * | 1/2002 | Wipfel et al. | ............ | 710/269 |
| 6,425,017 B1 * | 7/2002 | Dievendorff et al. | ......... | 719/315 |
| 6,442,565 B1 * | 8/2002 | Tyra et al. | ............ | 707/102 |
| 6,671,746 B1 * | 12/2003 | Northrup | ............ | 719/331 |
| 6,785,726 B1 * | 8/2004 | Freeman et al. | ............ | 709/227 |
| 6,789,112 B1 * | 9/2004 | Freeman et al. | ............ | 709/223 |
| 6,792,607 B1 * | 9/2004 | Burd et al. | ............ | 719/316 |
| 6,920,636 B1 * | 7/2005 | Dievendorff et al. | ......... | 719/315 |
| 6,922,705 B1 * | 7/2005 | Northrup | ............ | 707/200 |
| 6,958,973 B1 * | 10/2005 | Chen et al. | ............ | 370/235 |
| 6,981,047 B2 * | 12/2005 | Hanson et al. | ............ | 709/227 |
| 7,046,778 B2 * | 5/2006 | Martin et al. | ............ | 379/201.01 |
| 7,159,111 B1 * | 1/2007 | Ganapathy | ............ | 713/167 |
| 2003/0121027 A1 * | 6/2003 | Hines | ............ | 717/135 |
| 2004/0103218 A1 * | 5/2004 | Blumrich et al. | ............ | 709/249 |

OTHER PUBLICATIONS

"The Next Generation of Intel IXP Network Processors", M. Adiletta et al., Intel Technology Journal, vol. 06, Issue 03, Published: Aug. 15, 2002, ISSN 1535766X, pp. 6-18.
"Implementing Voice over AAL2 on a Network Processor," J. Sydir et al., Intel Technology Journal, vol. 06, Issue 03, Published: Aug. 15, 2002, ISSN 1535766X, pp. 70-82.

* cited by examiner

Primary Examiner—Van H Nguyen
(74) Attorney, Agent, or Firm—Blakely, Sokoloff, Taylor & Zafman LLP

(57) ABSTRACT

Techniques for parallel processing of events within multiple event contexts include dynamically binding an event context to an execution context in response to receiving an event by storing arriving events into a global event queue and storing events from the global event queue in per-execution context event queues are described. The techniques associate event queues with the execution contexts to temporarily store the events for a duration of the binding and thus dynamically bind the events received on a per-event basis in the context queues.

17 Claims, 7 Drawing Sheets

METHOD FOR PARALLEL PROCESSING OF EVENTS WITHIN MULTIPLE EVENT CONTEXTS MAINTAINING ORDERED MUTUAL EXCLUSION

BACKGROUND

A network processor application processes packets from a large number of flows (in a connectionless network) or connections (in a connection oriented network). While, packets generally arrive over a physical interface in the order in which they were transmitted, the network processor application cannot make any assumptions about the order in which it will receive the packets.

SUMMARY

In an aspect, a method for dynamically binding an event context to an execution context in response to receiving events is disclosed. The method includes storing arriving events into a global event queue that is accessible by event contexts, storing events from the global event queue in per-execution context event queues, and associating an event queue with the execution context to temporarily store the events for the event context for a duration of the dynamic binding.

DETAILED DESCRIPTION

Figure 1:
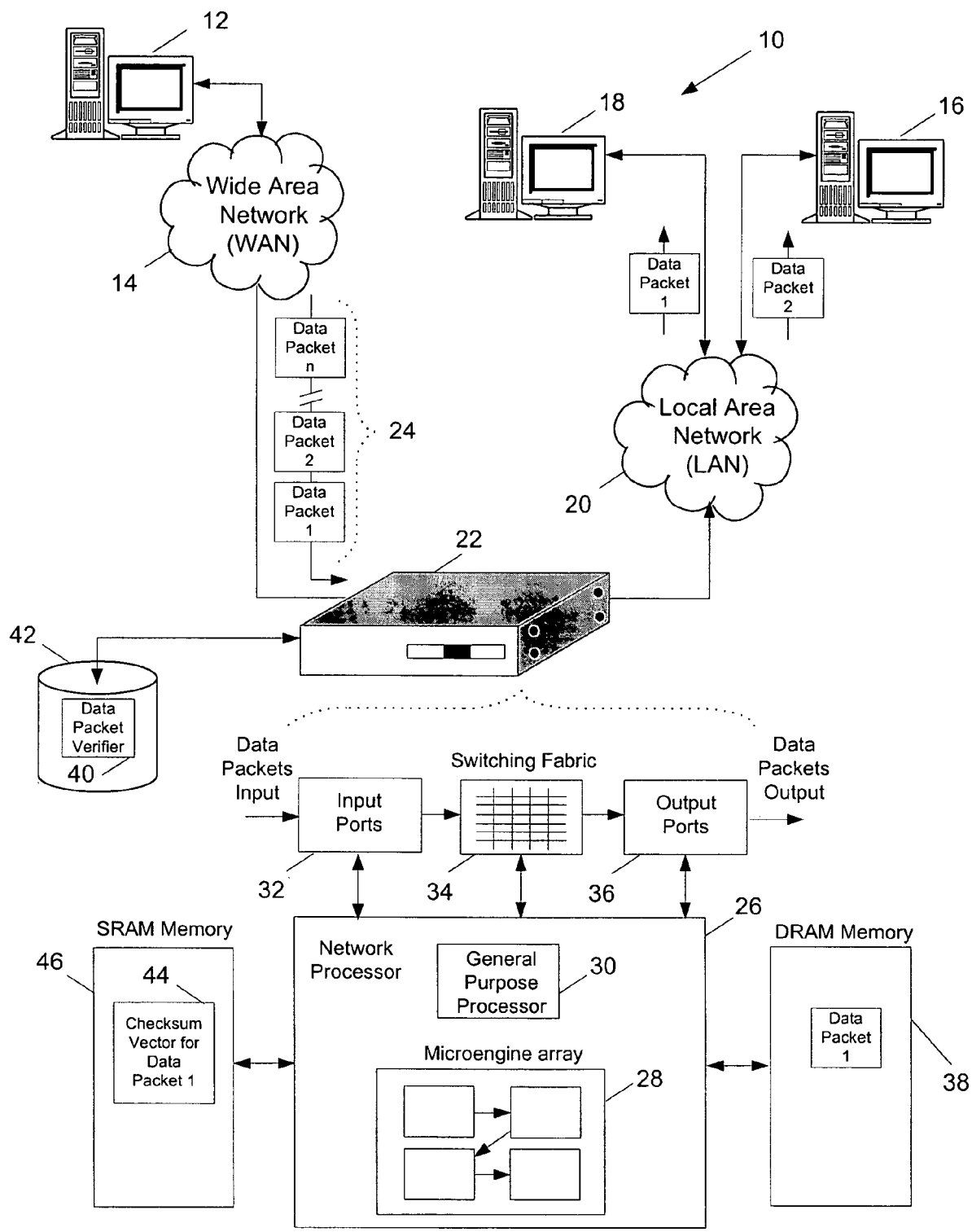
FIG. 1 is a block diagram depicting a system for processing packets.

Referring to FIG. 1, a system 10 for transmitting data packets from a computer system 12 through a wide area network (WAN) 14 to other computer systems 16, 18 through a local area network (LAN) 20 includes a router 22 that collects a stream of "n" data packets 24 and routes the packets through the LAN 20 for delivery to the appropriate destination computer system 16 or computer system 18. In this example, after verification, data packet 1 is transmitted for delivery at computer system 18 and data packet 2 is transmitted for delivery at computer system 16.

The router 22 includes a network processor 26 that processes the data packet stream 24 with an array of, e.g., four, six or twelve programmable multithreaded microengines 28. Each microengine executes instructions that are associated with an instruction set (e.g., a reduced instruction set computer (RISC) architecture) used by the array of microengines 28 included in the network processor 26. Since the instruction set is designed for specific use by the array of microengines 28, instructions are processed relatively quickly compared to the number clock cycles typically needed to execute instructions associated with a general-purpose processor.

Each one of the microengines included in the array of microengines 28 has a relatively simple architecture and quickly executes relatively routine processes (e.g., data packet verifying, data packet classifying, data packet forwarding, etc.) while leaving more complicated processing (e.g., look-up table maintenance) to other processing units such as a general-purpose processor 30 (e.g., a StrongArm processor of ARM Limited, United Kingdom) also included in the network processor 26.

Typically the data packets are received by the router 22 on one or more input ports 32 that provide a physical link to the WAN 14 and are in communication with the network processor 26 that controls the entering of the incoming data packets. The network processor 26 also communicates with a switching fabric 34 that interconnects the input ports 32 and output ports 36. The output ports 36, which are also in communication with the network processor 26, are used for scheduling transmission of the data packets to the LAN 20 for reception at the appropriate computer system 16 or 18. Typically, incoming data packets are entered into a dynamic random access memory (DRAM) 38 in communication with the network processor 26 so that they are accessible by the microengine array 28 for determining the destination of each packet or to execute other processes.

The network processor 26 has N execution contexts executing in parallel to perform a sequence of operations in response to receiving plural packets. An execution context can be a process or a thread. The execution contexts within the network processor 26 can all run on the same physical processor or can run on multiple processors in the network processor 26. Events arrive in the network processor 26 and each event is processed by free one of the N execution contexts. After processing the event, the execution context again becomes "free" and is ready to process another event.

The events (and associated processing) are classified into M event contexts. Each event belongs to one and only one event context. The number of event contexts, e.g., the number of packets received and the operations that are required on the packets is generally much larger than the number of execution contexts available (M>>N). The network processor 26 uses any available execution contexts to process unrelated events (those from different event contexts) in parallel while maintaining order in the processing of events within each of the event contexts.

Each packet is a member of one and only one flow/connection (a packet is an event in this example). While it can be a requirement to process packets within a flow or a connection in the order in which they were received, it is generally not required that packets from different flows/connections be processed in the order in which they were received.

Figure 2:
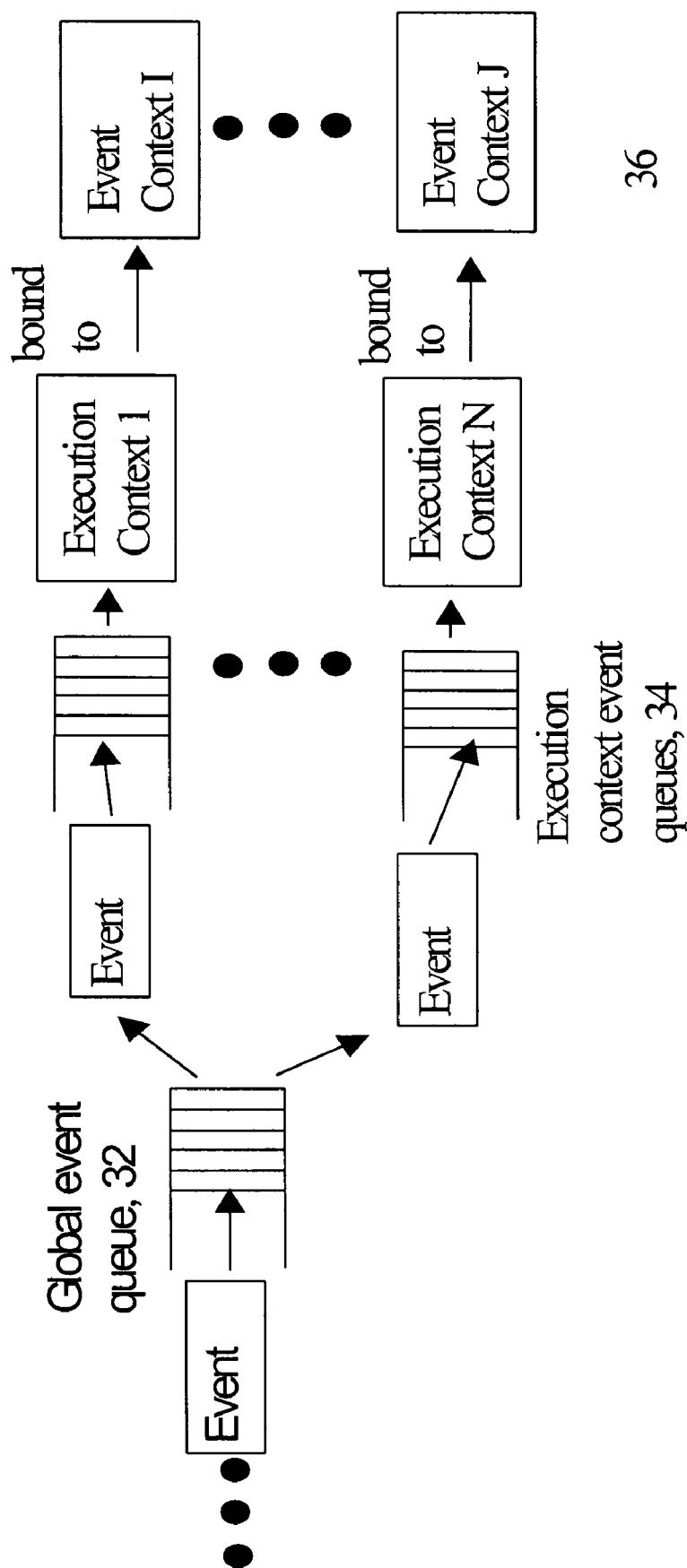
FIG. 2 is block diagram of a queue arrangement.

Referring to FIG. 2, one approach to use any available execution contexts to process unrelated events includes dynamically binding an event context to an execution context in response to receiving an event. Events arrive into the system via a global event queue 32 and are stored in per-execution context event queues 34. In the example discussed events are packets. A FIFO event queue 36 is associated with the execution context to temporarily store the events (packets) for that event context (for the duration of the binding). The events (packets) that are received by the network processor are dynamically bound on a per-event basis in the context queues 36.

An execution context can be in one of four states, idle, binding, bound, or unbinding. In idle state an execution context waits for an event to arrive into the system. In the binding state, an execution context has received an event and is determining if the event context to which the event belongs is bound to another execution context. In a bound state, an execution context is bound to a specific event context. The execution context processes events for that event context and the event queue 34 associated with that execution context is used to store events for the event context to which it is bound.

An execution context can be bound to at most one event context at any given time. In the unbinding state, the execution context determines if it has any more events to process for the event context to which it was bound and either unbinds itself from the event context, going to idle state or begins processing another event from that context, going back to bound state.

An event context can also be in one of two states, unbound or bound. In the unbound state, an event context is not bound to any execution contexts and its events are not currently being processed. In the bound state, an event context is bound to an execution context and that execution context is processing events for the event context. An event context can be bound to at most one execution context at any given time. Because it is possible that a new event can arrive into the system at a time when all execution contexts are busy processing other events, the global FIFO event queue 32 is used to queue events when the events first arrive into the system.

Figure 3:
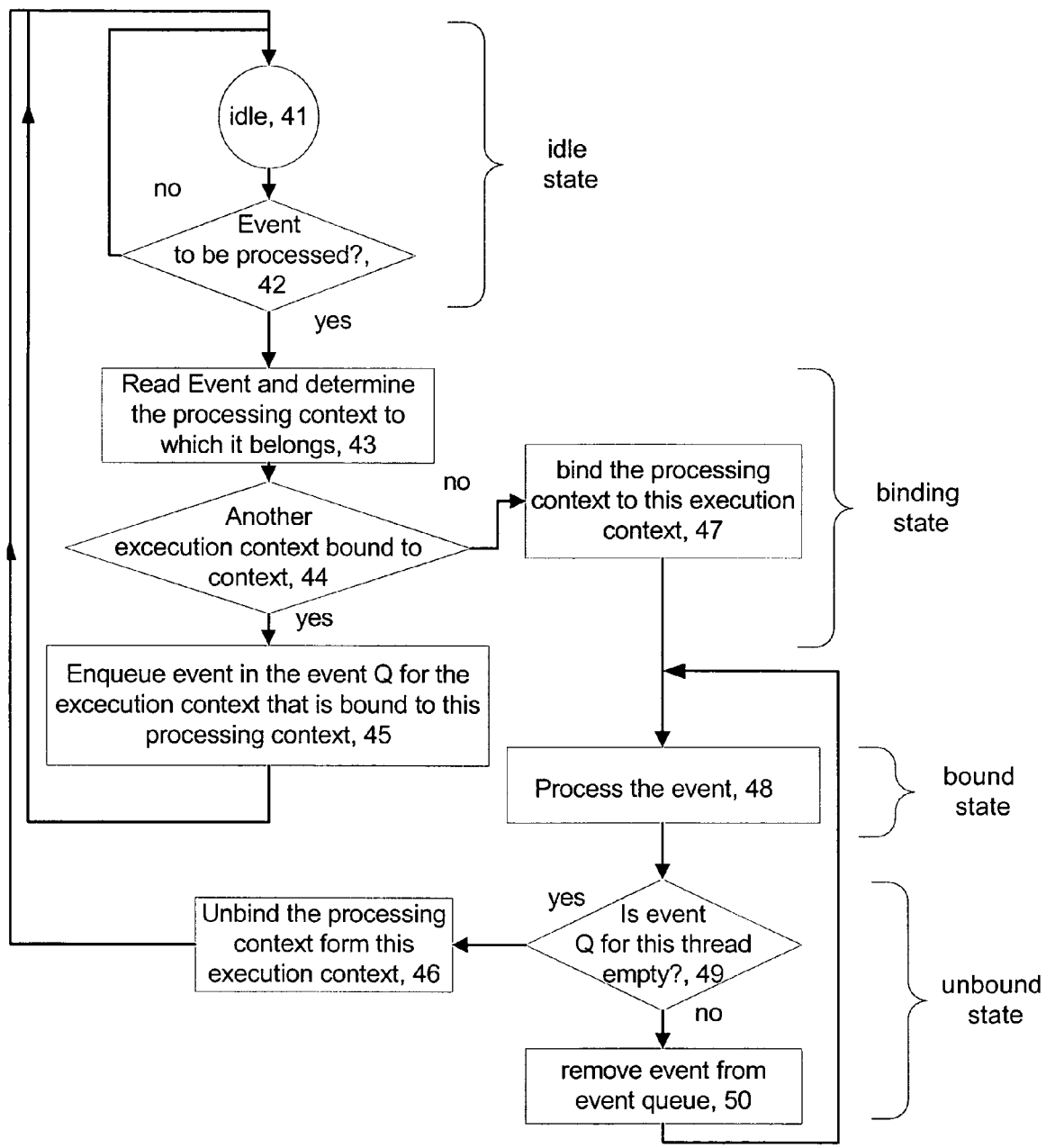
FIG. 3 is a flow chart showing event processing.

Referring to FIG. 3, when events, e.g., packets arrive into the system they are queued into the global event queue 32 in the order in which the packets arrive. Execution contexts remain in idle state 41 until there is a packet at the head of the global event queue. When this occurs an execution context that is in idle state is 42 assigned to process the packet and goes into a binding state. This execution context removes the packet from the event queue, determines the event context 43 and determines 44 if the event context to which this packet belongs is already bound to an execution context. One technique to determine if the event context is already bound to an execution context is described below in FIG. 5. If the event context is already bound, the execution context that is in a binding state places 45 the packet in the event queue of the other execution context to which the event context associated with the packet is already bound to, the execution context unbinds 46 the event context, and returns 41 to idle state.

If the event context associated with the packet is not already bound to an execution context, this execution context that is in the binding state binds 47 itself to that event context. The process of binding an event context to an execution context involves updating the state of the execution context from idle to bound, updating the state of the event context from "not bound" to bound, and recording that this execution context is bound to this event context.

Having bound the event context to itself, the execution context processes 48 the packet. When the execution context completes processing an event, the execution context transitions to an unbinding state. The execution context checks its event queue 49 to see if any additional events have been queued for it to process. These events are guaranteed to be part of the same event context and are queued in the order in which they were received. If there is at least one event in the queue, the execution context returns to the bound state, removes 50 the event from the queue and processes the event. If there are no events in the queue, the execution context unbinds 46 itself from the event context, and transitions to an idle state 41. This involves updating the states of the execution context and event context.

In general, one execution context within the system can be in binding or unbinding state at one time to ensure that an event context is bound to at most one execution context and to ensure that events, e.g., events, queued into the event queue 34 of an execution context are queued in the order in which they were received.

Because the assignment of event contexts to execution contexts is performed dynamically, the process automatically adapts to different distributions of events within event contexts. The process also automatically adapts to uneven and changing distribution of events among the event contexts over short and long timescales. The process uses memory efficiently, recognizing that the number of active event contexts within the system is at most the number of execution contexts used to process the events. This permits implementation of per-event context event queues by dynamically assigning the event queues to per-execution context event queues 34. Therefore, this scheme achieves in-order processing on events in the same event context, while achieving parallelism across events in different event contexts.

Figure 4:
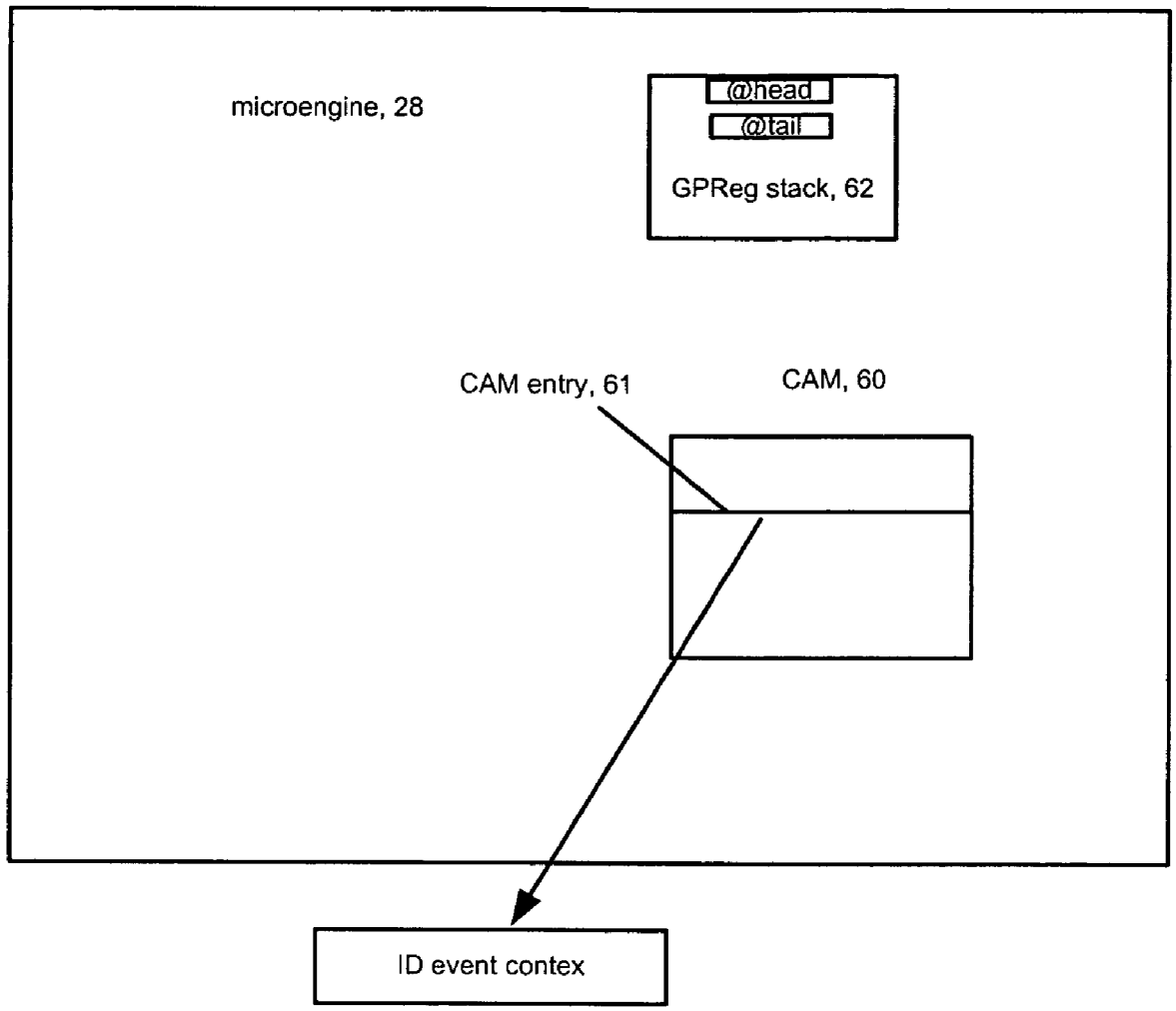
FIG. 4 is a block diagram depicting a microengine.

Referring to FIG. 4, each of the microengines 28 of the network processor can execute, e.g., 8 threads, which serve as execution contexts. Each of the microengines 28 has a content addressable memory (CAM), 60 which stores and maintains information about which event contexts are bound to which threads. Each thread is assigned an entry 61 in the CAM 60 (according to its thread number). When a thread binds itself to an event context it stores an identifier (ID) of the event context in the CAM in its entry 61. The microengine also includes other components including a general purpose register stack 62 that stores inter alia two pointers @head and @tail, to be discussed below. The threads share the resources of the network processor 26 using a cooperative multitasking model. Critical processing is enforced by having the threads not yield resources during critical processing while the threads are in a binding or an unbinding state.

Figure 5:
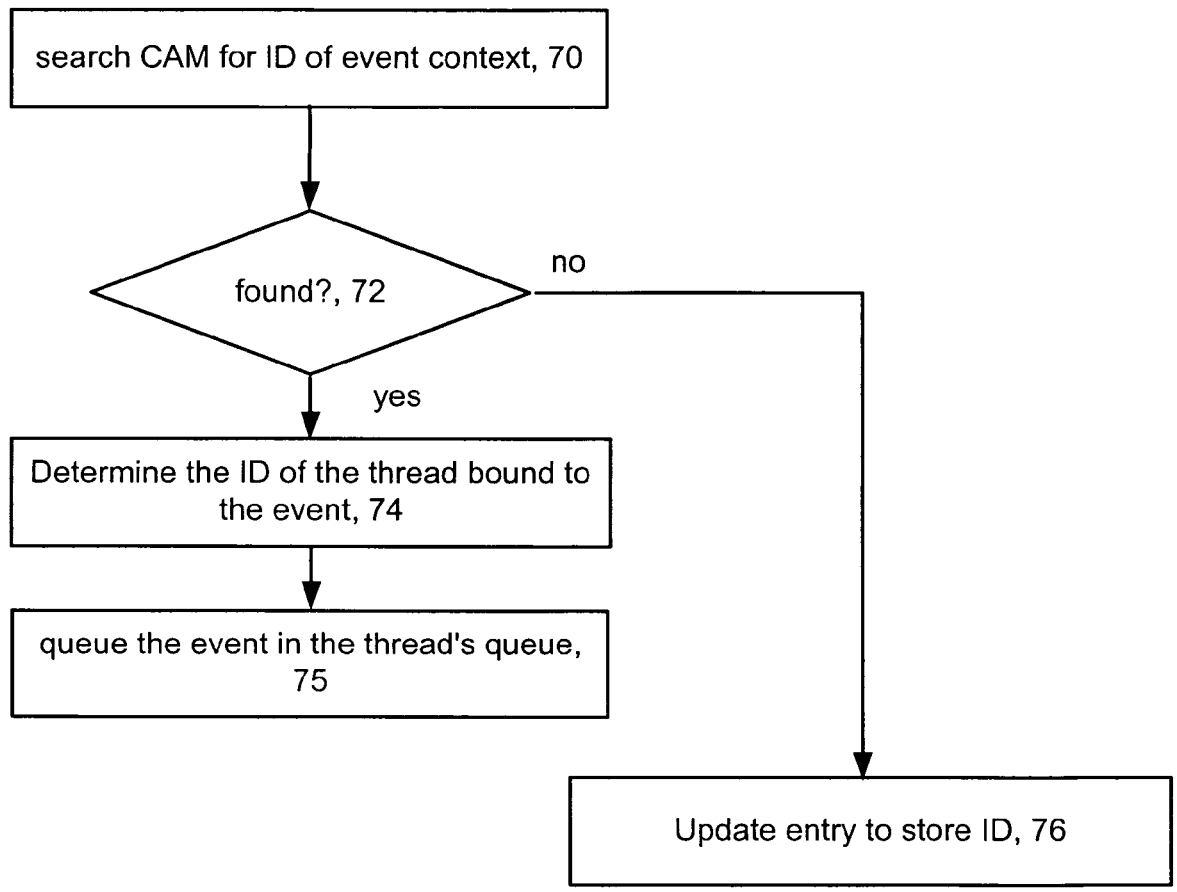
FIG. 5 is flow chart depicting processing to handle content memory addressable lookups.

Referring to FIG. 5, when a thread is in binding state, the thread searches 70 the CAM for the ID of the event context to which the event, e.g., packet, that the thread is processing belongs. If the thread finds 72 the event context in the CAM (a CAM hit) the thread determines 74 from the CAM entry, the ID of the thread that is bound to the event context and queues 75 the event, e.g., in that thread's queue 35. If the event context is not in the CAM (a CAM miss) the thread updates 76 its entry to store that event context ID.

The execution context event queues 34 are implemented in local memory within the microengine 28, while the global event queue 32 is implemented in local memory in some instances and in scratch memory in other instances. Other arrangements are possible.

An exemplary application of the foregoing will be described for a voice over AAL2 application. AAL2 is specified in International Telecommunications Union (ITU) recommendations I363.s and I366.2. In this application, packets from voice channels are multiplexed into so called AAL2 channels. In the voice network to ATM network direction, voice packets are received, it is determined which AAL2 channel they belong to, and the processing of packets for an AAL2 channel occurs in order (the AAL2 channels are the event contexts). In the ATM to voice network direction, AAL2 cells are received and the voice packets are extracted, it is determined to which voice channel they belong, and the voice packets are processed in order within each voice channel (the voice channels are the event contexts). The Voice over AAL2 (VoAAL2) service, AAL type 2 is subdivided into a Common Part Sublayer (CPS) and a Service-Specific Convergence Sublayer (SSCS).

CPS Receive

In an ATM cell, there could be any numbers of embedded CPS packets. Each CPS packet has a three byte header and 0 to 64 bytes of payload. CPS packets can be combined back to back to construct an ATM cell. CPS packets can also be arbitrary broken across ATM cells. A CPS transmitter puts CPS packets back to back and takes the first 48 bytes to construct an ATM cell. The CPS transmitter takes next 48 bytes to construct the next ATM cell of the same virtual channel (VC). Therefore, a CPS receiver can receive a CPS packet, which is broken across more than one ATM cell. Even the CPS header could be broken across multiple ATM cells. The length of a CPS packet extracted from an ATM cell is known only after the CPS header is extracted.

The length of the first CPS packet gives the start of next CPS packet (if any) to continue extraction of the next CPS packet from that position. In case the last CPS packet in a cell is broken, the reassembled context is stored, so that the CPS packet can be completed when the next ATM cell is received.

For a particular virtual channel (VC), the second cell can be processed only after the 1st cell has completed processing. Therefore, mutual exclusion and ordering have to be maintained. But, the time taken to process a cell can vary because of the variable number of CPS packets in an ATM cell.

If strict thread ordering is used for mutual exclusion, then bottlenecks will occur with those ATM cells with a large number of CPS packets. This can happen if some channels have small length CPS packets and other channels have larger length CPS packet resulting in a varied number of CPS packets per ATM cell. The channels with small length CPS packets (i.e., a larger CPS packets per ATM cell) will take more time to process a cell compared to channels with larger length CPS packets (i.e., fewer CPS packets per ATM cell) because processing time depends on the number of CPS packets in a cell.

However, the channels with small length CPS packets will have a larger budget for an ATM cell because within one cell, many CPS packets can be processed. On the other hand, channels with large CPS packets will have lower budget for an ATM cell as the ATM cell will have lower number of CPS packets. Therefore, more time can be taken to process small length CPS packets compared to large length CPS packets.

In strict thread ordering, all the threads will be bottlenecked by the processing in the first case even though, the time budget will be met for processing small length CPS packets whereas, the budget may not be met for processing large length CPS packets.

Strict thread ordering, which is equivalent to have a global lock across all virtual channels VCs while packet processing is not used. Instead, a per-VC lock arrangement is used to allow other VCs to process the ATM cells, even when a thread is locking a particular VC of very small CPS packets.

Mutual Exclusion and Thread Ordering

Threads put themselves to a free list (not shown) that is maintained by the microengines 28, to be notified whenever a cell is received. Threads are not woken up in same order of how they were inserted in the free list because in a case when two cells arrive back to back, the network processor 26 will signal the first two threads in the free list and both of the threads become eligible to run. Which of these two threads will be woken up first will depend of the thread running currently in any the microengine 28. After the current thread swaps out, the processor will schedule a next thread (depending on a round robin scheduling algorithm) as eligible to run. Therefore, the second thread can be woken up before the first thread and is undesirable.

To solve the above-described problem, the software maintains thread processing in the order that the threads went to sleep.

Figure 6:
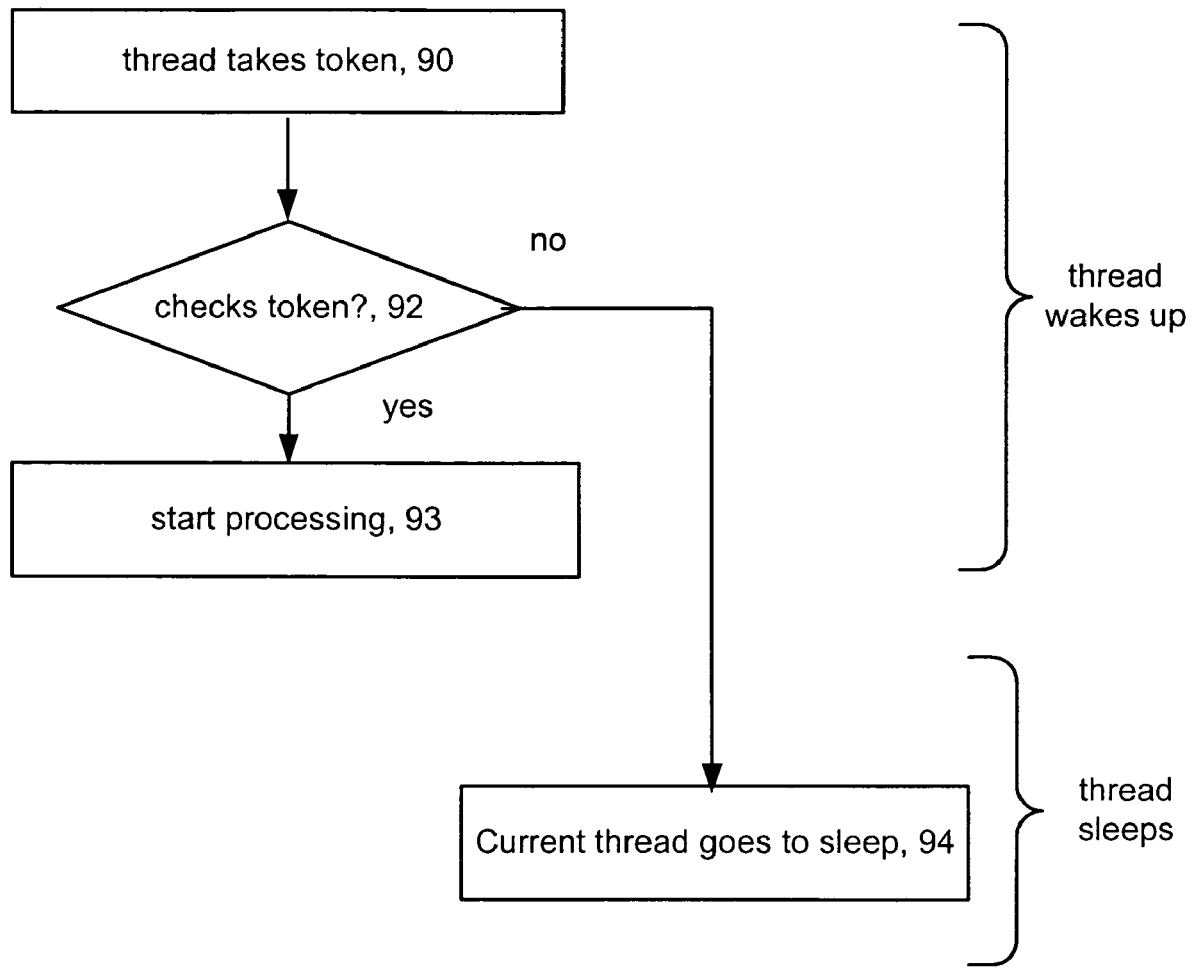
FIGS. 6 and 7 are flow charts depicting aspects of thread mutual exclusion and ordering.

Referring to FIG. 6, each thread before putting itself into the free list, takes 90 a software token. The token represents the position of the thread in a queue. When the thread wakes up, it checks 91 whether it has the token of the thread at the head of the hardware queue. If the token matches 92, then the thread is the correct thread and starts processing 93. If the tokens do not match, another thread is supposed to wake up before the current thread, and the current thread goes 94 to sleep.

Figure 7:
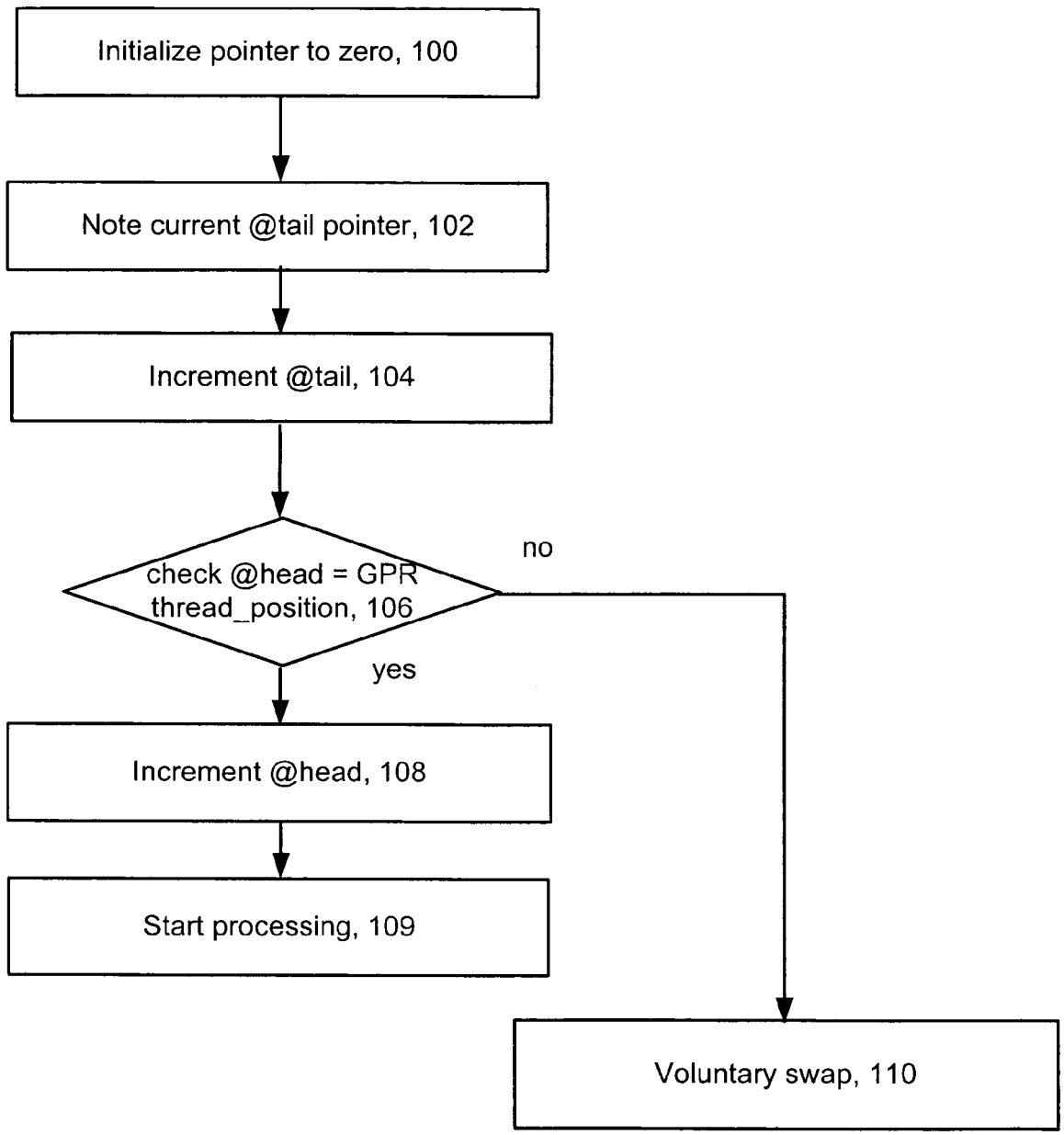

Referring to FIG. 7, to handle tokens, two pointers into an absolute general-purpose registers (GPRs) stack 62 (FIG. 4) in the microengine 28 are maintained. These pointers are called "@head" and "@tail." Both are initialized 100 to zero. Whenever a thread puts itself into the free list, the thread notes 102 down "@tail" as its current position (GPR thread_position) and increments 104 the "@tail." Whenever a thread wakes up, it checks 106 whether "@head" is equal to "GPR thread_position." In the case when GPR thread_position matches @head, @head is incremented 108 and the thread starts processing 109. If it does not match, the thread does 110 a voluntary swap out to allow other threads to run. This allows the thread at the head of the free list to run.

After the thread is woken up again, the thread again compares GPR thread_position with @head and while they are not equal it continues to voluntary swap out. Whenever they become equal, it increments @head and starts processing the RBUF element containing the ATM cell.

In this arrangement, if a cell A arrives before a cell B, cell A will be always started processing before cell B and thus maintaining cells ordering.

Mutual exclusion is maintained across the cells of the same VC by using the microengine CAMs. A CAM entry E (63 in FIG. 4) is used for each corresponding thread. Mutual exclusion processing initially clears all CAMs. If a thread $T_i$ is locking a cell of a VC, $VC_i$, then the thread writes a tag $VC_i$ on the CAM entry $E_i$. To unlock, the entry the thread writes a tag 0 to the CAM entry $E_i$. The status field of the CAM is not used. To check, whether a VC, $VC_j$, is locked, a thread performs a CAM lookup on the tag $VC_j$. If it is a hit, $VC_j$ is locked. The entry number returned by the CAM lookup is the thread number locking the $VC_j$. In the case of a miss, $VC_j$ is not locked.

Whenever a thread, $T_i$, receives data and identifies itself as the head of the hardware free list, the thread $T_i$ extracts out the VC of the cell from read status words. The thread $T_i$ performs a CAM lookup to check whether the VC is locked or not. In the case when it is not locked, the thread $T_i$ locks the VC and starts extracting the CPS packets from the cell. In case when the VC is locked, the thread $T_i$ queues the received data, a received RBUF element to a queue for the thread $T_j$ locking the VC. The queue is maintained on a per thread basis in the microengine's local memory (not shown). When a thread $T_j$ locks a VC, all other threads place the RBUF elements of same VC to the queue of the thread $T_j$. After putting RBUF to the queue of thread $T_j$, the thread $T_i$ puts itself back to the hardware freelist to receive another cell.

When the thread $T_j$ finishes processing the cell of the VC, before unlocking the VC, it checks whether there is any RBUF element queued for the thread $T_j$. If there is an element queued, it dequeues the head of the queue and processes the element. The thread $T_j$ does not unlock the VC, unless the queue for the thread $T_j$ is empty.

Methods can be performed by one or more programmable processors executing a computer program to perform functions of the invention by operating on input data and generating output. The method can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The processes described herein can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The processes described herein can also be implemented in other electronic devices individually or in combination with a computer or computer system. For example, the processes can be implemented on mobile devices (e.g., cellular phones, personal digital assistants, etc.).

The invention has been described in terms of particular embodiments. Other embodiments are within the scope of the following claims. For example, the processors on which the execution contexts run can be general purpose processors or specialized processors such as packet processing engines in a network processor. This invention applies to any system where events from a multitude of contexts are processed by a much smaller number of threads or processes.

What is claimed is:

1. A method comprising:
   at a computer, dynamically binding an event context to an execution context in response to receiving events by:
   maintaining the execution context in an idle state until an event arrives at a head of a global event queue that is accessible by event contexts;
   storing, in a memory associated with the computer, arriving events into the global event queue;
   storing, in the memory, events from the global event queue in per-execution context event queues; and
   associating, at the computer, an event queue with the execution context to temporarily store events for the event context for a duration of the dynamic binding;
   removing an event from the events for the event context in the event queue;
   placing the event in the event queue of other execution context to which the event context associated with the event is already bound to;
   determining the event context;
   determining if the event context to which the event belongs is already bound to the execution context:
   unbinding the event context; and
   returning to the idle state.

2. The method of claim 1 wherein the execution context can be in one of four states, idle, binding, bound, or unbinding.

3. The method of claim 1 wherein in the bound state, an execution context is bound to a specific event context and the execution context processes events for that event context and the event queue associated with that execution context is used to store events for the event context to which it is bound.

4. The method of claim 1 wherein in the unbinding state, the execution context determines if it has any more events to process for the event context to which it was bound and either unbinds itself from the event context, going to idle state or begins processing another event from that context, going back to bound state.

5. The method of claim 1 wherein in the event context can be in one of two states, unbound or bound.

6. The method of claim 1 wherein a global FIFO event queue is used to queue events when the events first arrive into a system.

7. The method of claim 1 wherein upon receiving an event, the method further comprises:
   assigning an execution context that is in idle state to process the event.

8. The method of claim 1 wherein if the event context is not already bound, binding an execution further comprises:
   binding the execution context to that event context by updating a state of the execution context from idle to bound, updating the state of the event context from "not bound" to bound, and recording that this execution context is bound to this event context; and
   processing the event.

9. The method of claim 8 wherein when the execution context completes processing the event, the execution context transitions to an unbinding state.

10. The method of claim 9 wherein when the execution context completes processing the event, the execution context checks its event queue for additional events to process.

11. The method of claim 9 wherein if there is at least one event in the event queue, the execution context returns to the bound state, removes the event from the event queue and processes the event, otherwise the execution context unbinds itself from the event context, and transitions to an idle state.

12. The method of claim 1 wherein the events are packets.

13. A computer program product residing on a computer readable medium for dynamically binding an event context to an execution context in response to receiving events comprising instructions for causing a processor to:
   maintain the execution context in an idle state until an event arrives at a head of a global event queue that is accessible by event contexts;

store events into the global event queue;

store events from the global event queue in per-execution context event queues; and associate a FIFO event queue with the execution context to temporarily store events for the event context for a duration of the dynamic binding;

remove an event from the events for the event context in the FIFO event queue;

place the event in the FIFO event queue of other execution context to which the event context associated with the event is already bound to;

determine the event context;

determine if the event context to which the event belongs is already bound to the execution context:

unbind the event context; and return to the idle state.

14. The computer program product of claim 13 wherein upon receiving an event, the method further comprises instructions to:

assign an execution context that is in idle state to process the event.

15. The computer program product of claim 13 wherein if the event context is not already bound, instructions to bind an execution further comprises instructions to:

bind the execution context to that event context by updating a state of the execution context from idle to bound;

update the state of the event context from "not bound" to bound;

record that this execution context is bound to this event context; and process an event.

16. A computer system comprising:

a processor including multiple processing engines, each processing engine including multiple event contexts;

circuitry to dynamically bind an event context to an execution context in response to receiving an event and maintain the execution context in an idle state until an event arrives at a head of a global event queue that is accessible by all event contexts;

the global event queue to store arriving events;

per-execution context event queues to store events from the global event queue; and a FIFO event queue to temporarily store events for that event context for a duration of the binding, the circuitry further configured to:

remove an event from the events for the event context in the FIFO event queue;

place the event in the FIFO event queue of other execution context to which the event context associated with the event is already bound to;

determine the event context;

determine if the event context to which the event belongs is already bound to the execution context:

unbind the event context; and return to the idle state.

17. The apparatus of claim 16 wherein the global event queue is used to queue events when the events first arrive into the computer system.

* * * * *